C. TRUESDALE.

Cupola Furnace.

No. 2,724. Reissued Aug. 6, 1867.

Witnesses
J. H. Layman
F. Hillward

Inventor
Charles Truesdale
By Knight Bros
Attys

N. PETERS, Photo-Lithographer, Washington, D. C.

United States Patent Office.

CHARLES TRUESDALE AND WILLIAM RESOR & CO., OF CINCINNATI, OHIO, ASSIGNEES OF CHARLES TRUESDALE.

*Letters Patent No.* 54,470, *dated May* 1, 1866; *reissue No.* 2,724, *dated August* 6, 1867.

IMPROVEMENT IN CUPOLA AND OTHER MELTING-FURNACES.

The Schedule referred to in these Letters Patent and making part of the same.

TO WHOM IT MAY CONCERN:

Be it known that CHARLES TRUESDALE, of Cincinnati, Hamilton county, Ohio, invented a new and useful Improvement in Cupolas and other Melting-Furnaces; and we do hereby declare the following to be a full, clear, and exact description thereof, reference being had to the accompanying drawings, making part of this specification.

The object of this invention is to secure an active and uninterrupted melting action, especially toward the conclusion of the heat, at which period the common cupola is liable to "fall off" in delivery of metal, in consequence of becoming clogged by the "bridging" of congealed slag, flux, and metal opposite and around the issues of the tuyeres. In the customary horizontal arrangements of tuyeres, whose nozzles discharge flush with the general concavity or lining wall of the cupola, and in a common plane, that portion of the metal, slag, &c., which descends near said wall, on coming in contact with the comparatively cold air from the tuyere, becomes congealed, and, forming an impenetrable barrier to the blast, deflects the same violently against the lining of the cupola near the issue of each tuyere, causing the fire-brick or other lining material to burn out rapidly at those parts. Moreover, when once a "bridge" has commenced forming, the accumulated debris in front of each tuyere becomes the nucleus of further accretions, until nearly the entire area immediately above the tuyeres is obstructed by an arch of slag, cinders, &c., which arrests the melting process, and which is required to be laboriously removed before the cupola can be employed for another melting.

This improvement consists essentially in a system of tuyeres, whose ventages are adapted to discharge a blast of greater volume below than above.

This improvement also consists in arranging one or more series of tuyeres in vertical lines, and with diminished issues as they approach the top of the series.

This improvement further consists in projecting the openings or ventages of the tuyere beyond the inner lining, so as to approach the axis of the cupola, each series being protected by a pier or vertical set-off.

Figure 1:
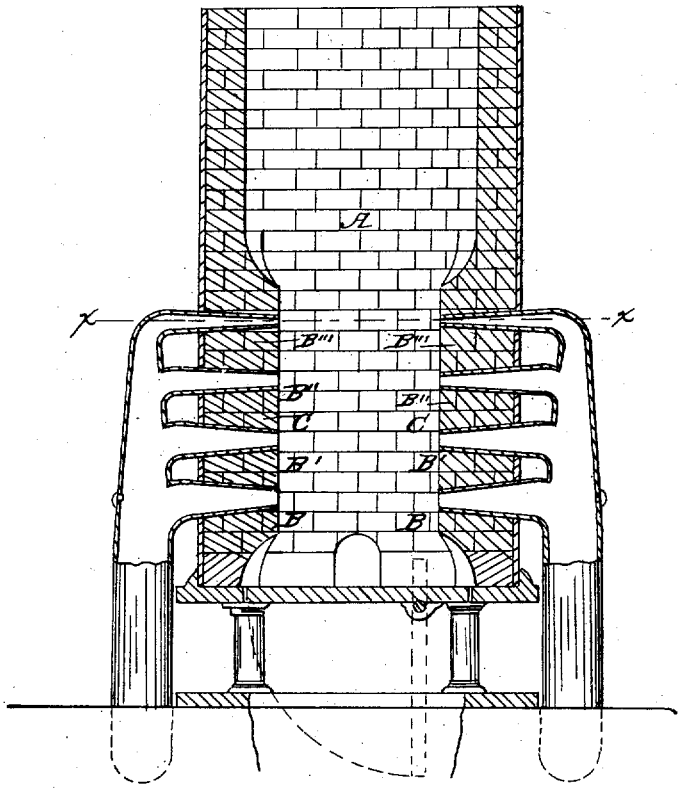
Figure 1 is a vertical section of a cupola embodying my improvement.
Figure 2:
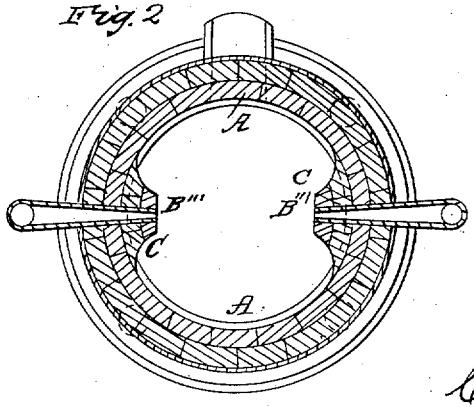
Figure 2 is a horizontal section at the line *x x*, fig. 1.

The wall A of this cupola is traversed by one or more vertical series of tuyeres, B B′ B″ B‴, and we prefer each tuyere of the series to be somewhat less in area of issue than that immediately below it. In the most complete form of this improvement the several nozzles of the tuyeres project a considerable distance into the interior of the furnace, each series being protected by a pier or set-off, C. The blast action being made to take place in one or more vertical columns instead of in a single horizontal stratum, any congelation consequent on a too feeble blast or otherwise must of necessity take a vertical rather than a horizontal direction, and cannot materially obstruct the draught of the furnace. By making the issue or ventage of each tuyere above the bottom one somewhat less than that immediately below it, we secure a gradual softening and reduction of the material, the smaller tuyeres at and near the upper part of the series operating to disintegrate the fragments of ore and flux, preparing them for the melting action of the more powerful tuyeres below, and greatly accelerating the activity of the furnace and the delivery of the molten metal. The blast issues being made to take place at the central and hottest part of the furnace, the usual chilling action is entirely absent. The vertical piers serve the double purpose of protecting, while moderately heating, the tuyeres, and they also serve, by removing the issues from the lining, to oblige any deflected currents to traverse a greater distance before they can impinge against it.

We have selected for illustration a form which has been successfully tested by us in the foundry, but do not desire to restrict the improvement to the precise arrangement above described, so long as the same results are obtained by means substantially equivalent; for example, although a regular gradation in the size of each consecutive tuyere in the series is believed preferable, yet the gradation may be more or less irregular or partial, and yet answer a good purpose, though in a lesser degree. Again, the tuyeres of each series may be increased in number and correspondingly diminished in individual area, or they may even be replaced by a vertical slot, which narrows towards its upper end. There may be a greater or less number of series of tuyeres than in the present illustration, as the size of the cupola, the nature of the work, material, &c., or other circumstances, may make desirable, while the mouths of the tuyeres and the faces of the protecting piers may incline outward or inward from a vertical direction. An inferior modification of this improvement may consist of a vertical series of graduated tuyeres, terminating flush, or nearly flush, with the lining, and without a protecting pier.

We claim herein as new—

1. The combination with a cupola or blast-furnace of a system of tuyeres, having openings so arranged as to discharge a blast of greater volume below than above, as set forth.

2. The provision in a cupola or melting-furnace of one or more vertical series of tuyeres, with graduated or decreasing ventage towards the upper portion of the series, substantially as set forth.

3. The arrangement of one or more vertical series of tuyeres, which project beyond the common or general lining wall, and are protected by vertical piers, substantially as set forth.

In testimony of which invention we hereunto set our hands.

CHARLES TRUESDALE,
WM. RESOR,
JACOB RESOR,
WM. RESOR, JR.,
J. B. RESOR.

Witnesses:
GEO. H. KNIGHT,
JAMES H. LAYMAN.